United States Patent
Gilman

[11] 3,827,461
[45] Aug. 6, 1974

[54] STREAM FILAMENT MIXER FOR PIPE FLOW

[75] Inventor: Frederick C. Gilman, Pompton Lakes, N.J.

[73] Assignee: Worthington Pump International, Inc., Mountainside, N.J.

[22] Filed: Nov. 21, 1972

[21] Appl. No.: 308,399

[52] U.S. Cl.................. 138/39, 48/180 B, 138/37
[51] Int. Cl.............................................. F15d 1/04
[58] Field of Search......... 138/38, 37, 39; 48/180 B, 48/148 M; 137/98 T

[56] References Cited
UNITED STATES PATENTS

| | | | |
|---|---|---|---|
| 518,016 | 4/1894 | Zahikian | 138/38 |
| 525,932 | 9/1894 | Whitney | 138/38 |
| 830,268 | 9/1906 | Wheelock | 138/38 X |
| 1,324,714 | 12/1919 | Allen | 138/38 X |
| 1,689,446 | 10/1928 | Miller et al. | 48/180 B |
| 1,852,380 | 4/1932 | Tabor et al. | 138/37 |
| 1,961,744 | 6/1934 | Durkee | 138/38 |
| 2,862,522 | 12/1958 | Yost | 138/37 |
| 2,929,248 | 3/1960 | Sprenkle | 138/37 X |
| 3,086,395 | 4/1963 | York | 73/205 R |
| 3,671,208 | 6/1972 | Medsker | 48/180 B |

Primary Examiner—Richard C. Queisser
Assistant Examiner—Daniel M. Yasich

[57] ABSTRACT

A stream filament mixer for reducing stratification of velocity-stratified flows and net vortex flows within a piping system, which includes: a housing to be connected in the piping system forming a fluid flow passage having an inlet and an outlet; associated guide surfaces formed by a plurality of circumferentially disposed oppositely twisted adjacent strips connected in the longitudinal line of the housing, for generating a plurality of oppositely rotating vortexes of equal strength in the fluid passing through the fluid flow passage formed by the housing so that the fluid will be delivered in a substantially homogeneous, unstratified flow from the outlet of the housing into the associate piping of the piping system in which the stream filament mixer is connected without generating substantial differential pressure across the point where the stream filament is connected in the piping system.

9 Claims, 16 Drawing Figures

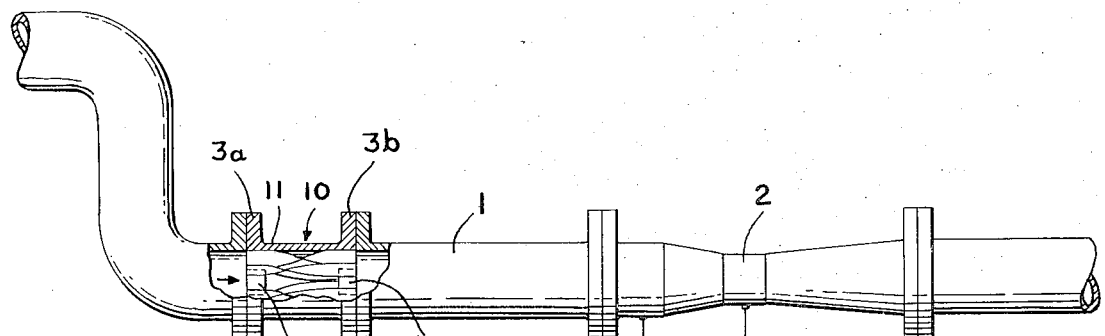
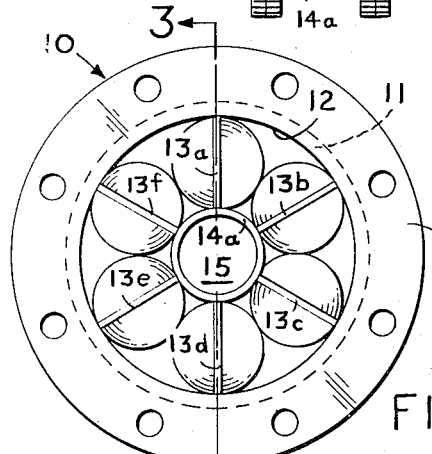
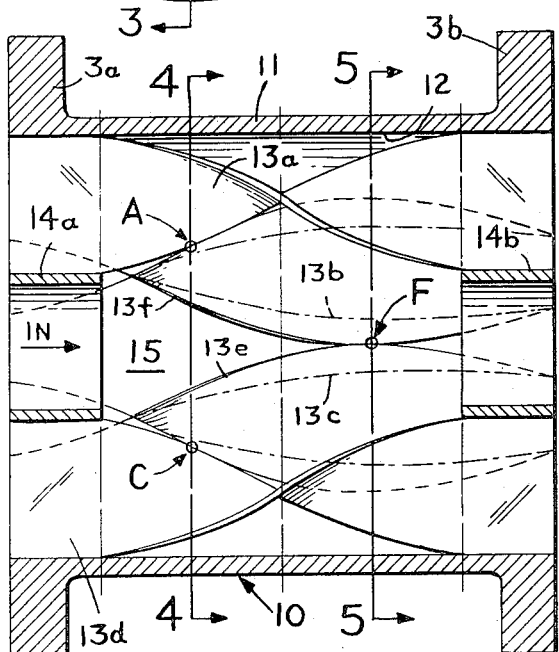
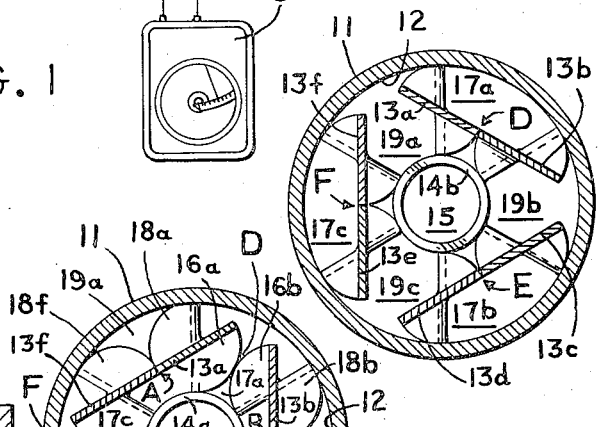
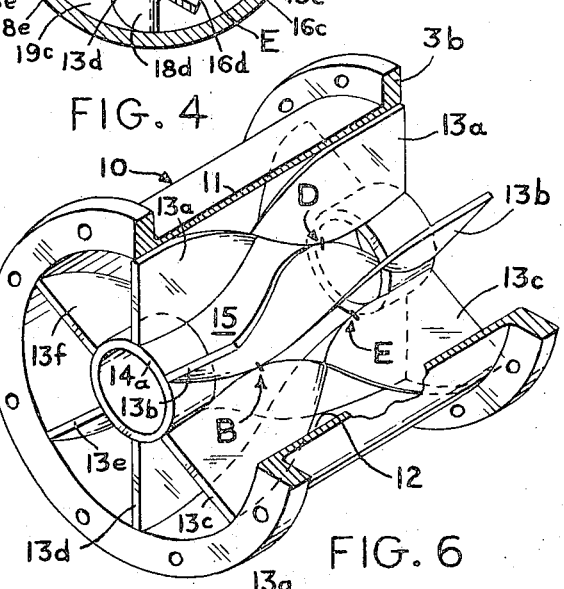
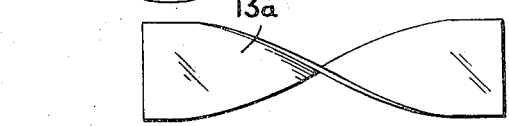

STREAM FILAMENT MIXER FOR PIPE FLOW

BACKGROUND OF THE INVENTION

This invention relates to means for measuring the rate of flow of fluid in a piping system and more particularly to a mixing device for insertion in the piping system to establish substantially uniform velocity and to reduce net vortex flow of the fluid in the approach piping to the flow meter measuring means of the piping system without developing substantial differential pressure across the mixing device.

In fluid flow systems, the movement and velocity of fluid through conduits or pipes will vary depending on the flow conditions in the piping system. The velocity of the fluid flowing in the piping system will generally vary for a given cross-section, so that the velocity will be relatively lower in the layers of fluid closest to the walls of the pipes as compared with fluid flowing along the core or center line of the pipes.

In the present application, the stream filaments, lines of fluid flow or strata of fluid flowing in and about the center line of the pipe will be termed the core or center line flow and the stream filaments, lines of fluid flow or strata of fluid about the core or central flow or which lies between the core or center line of fluid flow and the wall of the piping will be termed the peripheral flow. The significance of this definition will become more apparent in respect of the operation and function of the stream filament mixers in accordance with the present invention more fully described below.

It is noted that the term core flow or core fluid and peripheral flow and peripheral fluid are arbitrary definitions applied herein to simplify the description of the structure and operation of the present invention and it will be understood by those skilled in the art that there are no actually describle boundaries between these arbitrary designations and that the boundaries between these designated portions or sections of the fluid flow area are in fact indeterminable because of the continual variations between these portions or sections which occur depending on the conditions in the fluid as it enters the stream filament mixer.

The characteristics of fluid flowing in the core or center flow and in the peripheral flow must be taken into account in many industrial processes and is significant in the case of the flow meter measuring elements in fluid flow piping systems, such as nozzles, orifices and venturi tubes to which the present invention is particularly applicable because the coefficient of a flow meter measuring element is calibrated subject to a certain given set of conditions in the piping approaching the flow meter measuring element.

Thus, in a given fluid flow system, when the velocity pattern of the fluid flow in the approach pipe is changed from that which existed for calibration, the coefficient of any such given flow meter element will be altered. As a result, the flow meter measuring element does not function correctly or accurately.

Standards have been developed, such as the ASME Test Code and Hydraulic Institute Standards to provide means for obtaining valid reading of meters with such flow meter measuring elements in the fluid flow systems in which they are used. These standards for dynamic or head-differential flow meter measuring elements require substantial lengths of pipe measured by pipe diameters between the last flanged or disturbing element such as an elbow or pipe diameter reducer in the approach piping to the flow meter measuring element because the standards classify the length of the approach piping required in terms of pipe diameters.

In many practical applications of nozzles, orifices and venturi type flow meter measuring elements, it may not be economically feasible, or desirable, to provide the required extra lengths of straight approach pipe ahead of the meter measuring element for the purpose of assuring uniform and even fluid flow at the meter. Prior art corrective devices to shorten the required approach pipe length have included, flow straighteners of the "egg crate" and tube bundle types, stratification reducers (consisting of perforated plates or other resistance elements such as screens).

These known prior art devices have certain disadvantages. Flow straighteners remove whirl, but not the strata of unequal velocity components in the axial line of flow. Perforated plates and screens do not remove whirl, but are advantageous for eliminating unequal velocity components in the approach piping to the flow meter measuring element. Further, these prior art devices produce a substantial differential pressure drop across the point where they are inserted or connected into the piping system.

These problems are overcome in the present invention by rendering the velocity profile of the fluid in the approach piping to the flow meter measuring element uniform and homogeneous for any given cross-section. This is accomplished by a mixing device that doe not resist the higher velocity stream filaments with stationary obstructions, but includes intimate mixing of the strata or streams of fluid flowing at high and low velocities into the approach pipe in a manner to prevent generation or development of a substantial pressure drop at the point where the mixing device is connected into the system.

SUMMARY OF THE INVENTION

Thus, the present invention covers a mixing device which includes, a housing to be disposed in the approach piping for a flow meter measuring element, and means in the housing including circumferentially spaced oppositely twisted strips connected so that the opposing faces of the adjacent strips form an inner plurality of diverging and rotating vortexes in the fluid flowing along the core or central line of the fluid flow and the obverse or outer faces of adjacent strips form an outer plurality of converging, rotating vortexes for the fluid adjacent the walls of the approach piping which vortexes are of substantially equal strength and act to neutralize each other where the fluid leaving the housing of the mixing device and entering the approach piping downstream of the mixing device is rendered substantially linear, substantially uniform in velocity along any given cross-section, and free of net vortex flow in the downstream approach pipe to the flow meter measuring element.

THE DRAWINGS

For a better understanding of the invention reference may be had to the following detailed description taken in connection with the accompanying drawings in which:

FIG. 1 is a diagrammatic sketch of a piping system showing one form of the stream filament mixer therein in accordance with the present invention.

FIG. 2 is a view taken from the inlet end of the stream filament mixer shown in FIG. 1.

FIG. 3 is a longitudinal section taken on line 3—3 of FIG. 2, looking in the direction of the arrows.

FIG. 4 is a cross-section taken on line 4—4 of FIG. 3, looking in the direction of the arrows.

FIG. 5 is a cross-section taken on line 5—5 of FIG. 3, looking in the direction of the arrows.

FIG. 6 is an enlarged perspective view of the stream filament mixer shown in FIG. 1 having a section of the housing cut-away to show the flow passages formed therein.

FIG. 7 is a plan view of a vortex strip before it is twisted.

FIG. 8 is a side view of a twisted vortex forming strip.

Figure 10:
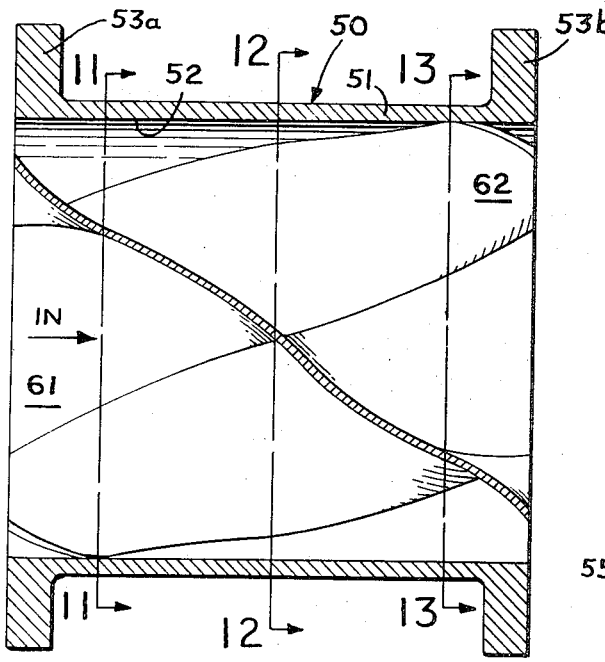
FIG. 10 is a vertical sectional view thereof taken on the line 10—10 in FIG. 9 looking in the direction of the arrows.
Figure 9:
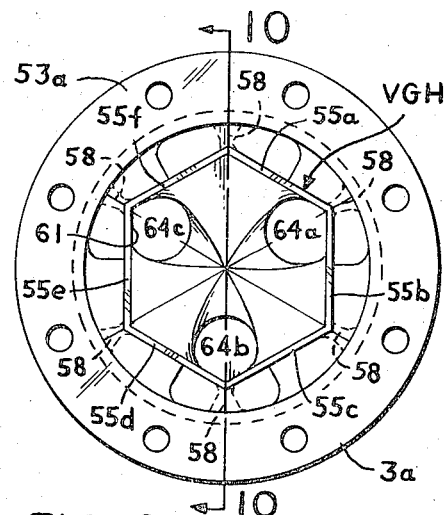
FIG. 9 is a view taken from the inlet end of the stream filament mixer shown in FIG. 10.
Figure 14:
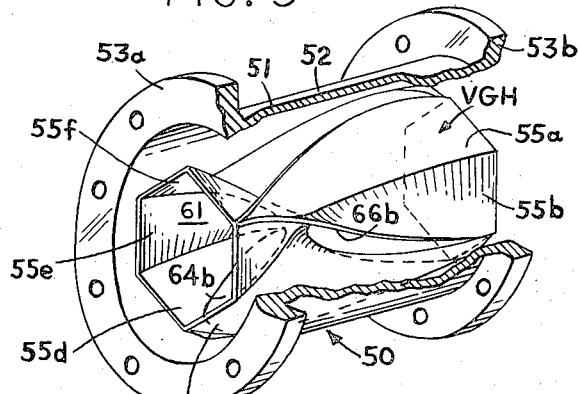
FIG. 14 is a perspectve view of the filament mixer of FIG. 10 with a section of the housing cut away to show the flow passages formed therein.
Figures 11, 12:
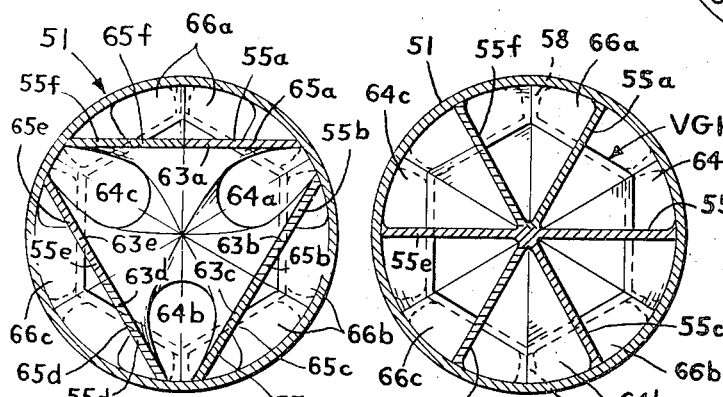
FIG. 11 is a vertical sectional view of the stream filament mixer taken on line 11 in FIG. 10 looking in the direction of the arrows.
FIG. 12 is a vertical sectional view taken on line 12—12 of FIG. 10 looking in the direction of the arrows.
Figure 13:
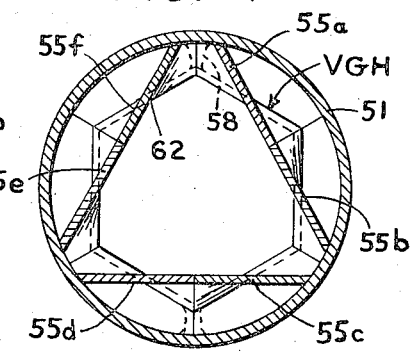
FIG. 13 is a vertical sectional view taken along line 13—13 of FIG. 10 looking in the direction of the arrows.
Figures 15, 16:
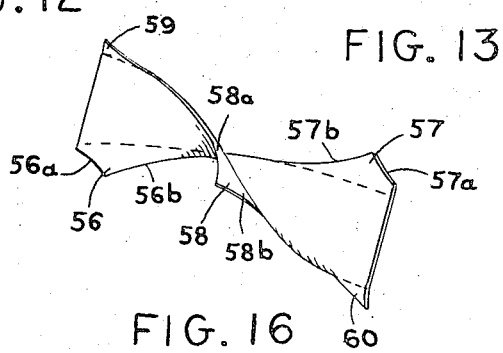
FIG. 15 is a plan view of a strip for forming the modified form of the invention shown in FIG. 10.

FIG. 16 is a side view of a vortex forming strip for the form of the invention shown in FIG. 15 after it has been twisted into shape. Referring to the drawings, FIG. 1 is a diagrammatic sketch of fluid flow piping system having a stream filament mixer therein generally designated 10 in accordance with the invention. The fluid system has an approach pipe 1, a venturi type element 2 and an associate flow meter 3 for measuring the fluid flow through the venturi 2. Connected in approach pipe 1 upstream of the venturi 2 by means of a spaced flange 3a and 3b is the stream filament mixer 10.

The stream filament mixer 10 illustrates one form of the invention and includes, an elongated cylindrical housing 11 which forms therethrough a fluid flow passage 12 in alignment with the approach pipe 1 when the stream filament mixer 10 is in assembled position as shown in FIG. 1.

The flange 3a will be disposed about the inlet end of the housing 11 and the flange 3b will be disposed about the outlet end of the housing 11 a spaced distance from the flange 3a. The housing and method of connecting the stream filament mixer 10 into the pipe 1 is conventional. It will be understood by those skilled in the art that the elements of the stream filament mixer, as is more fully described hereinafter, could be formed utilizing the approach pipe 1 itself as the housing to form fluid flow passage 12 without departing from the scope of the present invention.

While the figures of the drawings are not drawn to scale, it will be noted that the figures show generally a diameter to length ratio of approximately 3 to 4. This relative ratio will permit the development of elements or structures as hereinafter described for generating a plurality of oppositely rotating vortexes in the fluid flowing through the fluid flow passage for inducing intimate mixing of the high and low velocity streams, filaments or strata and reduce net vortex flow in the fluid flowing through the approach piping upstream of the stream filament mixer 10.

Thus, by further reference to FIGS. 2 to 6 of the drawings, the stream filament mixer 10 is shown as including a plurality of twisted strips designated 13a, 13b, 13c, 13d, 13e and 13f.

Twisted strips 13a, 13b, 13c, 13d, 13e and 13f are evolved by twisting the respective strips from a flat strip blank as shown at FIGS. 7 through approximately 180° as is illustrated for one twisted strip 13a shown at FIG. 8. Thus the strips appear bow like in side elevational and the twist is uniform in dimension from either end. In FIGS. 3 and 6 these twisted strips are illustrated as having an approximate width one-third the diameter of the fluid flow passage 12, and a length generally equal to the length of the fluid flow passage.

Vortex generating twisted strips 13a, 13b, 13c, 13d, 13e and 13f are welded or connected by any other suitable manner at their outer end to the inner wall of the housing 11 and at their inner end are welded or connected in any suitable manner to spaced annular ring members 14a and 14b. The rings 14a and 14b define the respective inlet and outlet ends of the stream filament mixer 10 and lie concentric with the central axis of the stream filament mixer.

Since the annular rings 14a and 14b are in alignment with each other, there will be an open, centrally disposed section or passage 15 from the inlet end to the outlet end of the housing 11 and the vortex generating strips 13a, 13b, 13c, 13d, 13e and 13f lie in the peripheral section of the fluid flow passage 12 about this centrally disposed section or passage 15.

The manner in which the stream filament mixer 10 operates is not by resisting the higher velocity stream filaments in the approach piping 1 upstream of the stream filament mixer with stationary obstruction, but rather by guiding or inducing movement of fluid from the annular peripheral section of the fluid flow passage 12 into the core or central section 15. Simultaneously fluid entering the housing 11 is guided or induced to flow from the core or central section 15 to the annular peripheral section so that intimate mixing of the high and low velocity streams, filaments or strata of fluid flowing from the upstream approach piping into the stream filament mixer 10 will occur.

Since this type of operation produces no material resistance but rather turning movement to the fluid flowing in the piping system, a relatively small differential pressure is developed across the stream filament mixer 10 at the point where it is connected in the piping system. The means for moving the fluid to produce this desirable operation will now be described.

Vortex generating strips 13a, 13b, 13c, 13d, 13e and 13f are mounted in a circumferential pattern about the annular rings 14a and 14b so that each respective twisted strip in assembled position is spaced from the next adjacent strip and is twisted in a direction opposite to that of the next adjacent strip. These vortex generating strips are mounted to extend both longitudinally and radially in the housing 11 and in this illustrated form of the invention are spaced at an angle of 60° from each other so that their side edges can be welded or connected to each other approximately one-third the distance from the end of each respective strip as is shown by the character letters A. B. C. D. E. and F. in FIGS. 3, 4, 5 and 6 of the drawings. This arrangement permits the opposing inner guide surfaces 16a and 16b of vortex generating strips 13a and 13b to provide a first inner to outer flow vortex generating passage 17a; the opposing inner guide surface 16c and 16d of vortex generating strips 13c and 13d provide a second inner to outer flow vortex generating passage 17b and the opposing inner guide surfaces 16e and 16f of vortex generating strips 13 e and 13f provide a third inner to outer flow vortex generating passage 17c for including movement of core or center line fluid flow towards the peripheral section, all of which is shown clearly in FIGS. 3, 4, 5 and 6 of the drawings.

Similarly, the obverse or outer guide surfaces 18a and 18f on vortex generating strip 13a and 13f provide a first outer to inner flow vortex generating passage 19a; the obverse or outer guide surfaces 18b and 18c of vortex generating strips 13b and 13c provide a second outer to inner flow vortex generating passage 19b and the obverse or outer guide surfaces 18d and 18e of vortex generating strips 13d and 13e provide a third outer to inner flow vortex generating passage 19c for inducing movement of peripheral flow of fluid towards the core or center line fluid as is shown in FIGS. 3, 5 and 6 of the drawings.

Thus, there are three associate inner facing guide surfaces and three associated obverse facing guide surfaces on the vortex generating strips 13a, 13b, 13c, 13d, 13e and 13f because each vortex generating strip has a width approximately one-third the diameter of the fluid passage 11. Dimensional changes can be made, to accommodate a lesser or greater number of vortex strips, by increasing or decreasing the width of the vortex generating strips.

These associated inner facing guide surface 16a, 16b, 16c, 16d, 16e and 16f and the obverse facing guide surfaces 18a, 18b, 18c, 18d, 18e and 18f provide in the stream filament mixer 10 six vortex generating passages 17a, 17b, 17c, and 19a, 19b, 19c of substantial equal functional strength which guide or induce movement and mixing of both the higher and lower velocity streams or strata of the fluid flowing from the upstream portion of the approach pipe 1 into the stream filament mixer 10. These filaments streams and strata of higher and lower flow energy are intimately mixed and passed from housing 11 into the remaining downstream portion of the approach pipe 1 as one stream of fluid with a relatively uniform and homogeneous cross-section.

CLOSED PASSAGE FORM OF THE INVENTION

Another form of the stream filament mixer in accordance with the present invention generally designated 50 is shown at FIGS. 9 to 16 of the drawings. Stream filament mixer 50 may be inserted into the approach pipe 1 of the fluid flow system shown in FIG. 1 of the drawings in place of the mixer 10 and acts in the same manner to reduce stratification of the velocity stratified flow and net vortex flows within the piping system by the same technique of intermixing and averaging of high and low velocity stream filaments of the fluid flowing through approach pipe 1 as was described for the form of the invention shown in FIGS. 1 to 6 of the drawings.

Thus, FIGS. 9 to 16 show that the stream filament mixer 50 includes a housing 51 generally cylindrical in cross-section which forms a flow chamber 52 therethrough having conventional flanges as at 53a at the inlet end and 53b at the outlet end to provide means for connecting the stream filament mixer 50 in the approach pipe 1.

As in the form of the invention shown in FIGS. 1 to 16 of the drawings, the layers of fluid at relatively high velocity from the core or center section of the upstream approach pipe 1 and layers of fluid at relatively low velocity adjacent the inner wall of the pipe 1 are intermixed in the stream filament mixer 50 by means for deflecting the peripheral fluid filaments, streams or layers toward the central or core section so that the stream filament mixer 50 will pass fluid into the approach pipe 1 downstream thereof which is of substantially uniform character with respect to velocity and will reduce the net vortex distribution of the stream filament layers of the fluid flowing through the approach pipe 1.

The intermixing in accordance with the present invention is accomplished by a plurality of vortex generating elements similar to the twisted strip elements of the form of the invention first described except that the strip elements of this form of the invention are joined along their side edges to form confined vortex generating passages.

Thus, the housing 51 for this form of the invention is shown as having vortex generating twisted strip elements 55a, 55b, 55c, 55d, 55e and 55f mounted therein.

The vortex generating twisted strips 55a, 55b, 55c, 55d, 55e and 55f are approximately one-half the diameter of the fluid flow passage 52 and have a length generally equal to the length of the fluid flow passage. These twisted strips are evolved by twisting the respective strips from a flat strip blank as shown in FIG. 15 approximately 180° as is illustrated for one twisted strip 55a as shown at FIG. 16.

Since the twisted strips of this form of the invention are joined to form confined vortex generating passages, the strip lengths will have a form or shape to achieve this result.

Thus, at FIGS. 15 and 16 the elongated flat strip 55a is shown to include laterally extending projections from the side edges thereof. On one side edge are side projections or side spurs as at 56 and 57 inwardly of the end edges of the twisted strip and on the other side edge a medially disposed side projection or central spur 58 and side projecting end spurs as at 59 and 60.

Since the side projections 56 and 57 are in-board of each respective end of the twisted strip 55a an outer arcuate portion as at 56a and 57a is formed between the side spurs 56 and 57 and the end of the twisted strip and elongated inner arcuate portions as at 56b and 57b are formed between each of the side spurs 56 and 57 so that the central portion between the side projection or side spur provides a substantially arcuate side edge for each respective strip therebetween.

The central spur 58 is provided with elongated arcuate portions of equal length on either side thereof as at 58a and 58b which merge or terminate at the respective tip spurs 59 and 60 at the end of the side edge on the same side with the central spur 58.

The tip spurs 59 and 60 are smaller than the side projection or side spurs 56 and 57 which last mentioned spurs are in turn smaller than the medial or central spur 58. However, the arcuate portions on either side of the respective spurs are such that the strip blanks are uniform in plan view as is clear from FIG. 15 of the drawings. This uniformity of construction is desirable and facilitates joining of the side edges of the respective twisted strips, 55a, 55b, 55c, 55d, 55e, and 55f to each other because these strips will be mounted so that the respective edges of adjacent strips will fit to engage each other when the strips are placed in assembled position. Thus, the side projections or side spurs 56 and 57 are so contructed that they are adapted to engage and be connected as by welding or other suitable connecting means to the end spurs 59 and 60 on the next adjacent twisted strip when the twisted strips are placed in assembled position in the housing 52 as will now be described.

Vortex generating strips, 55a, 55b, 55c, 55d, 55e, and 55f extend longitudinally of the housing 51 and are mounted in a circumferential pattern with each respective twisted strip in assembled position twisted in a direction opposite to that of the next adjacent strip. This arrangement and the uniform construction of the strip as above described will permit both the short outer arcuate portions 56a and 57a of an associated side projection or spur 56 or 57 to engage the respective tip spurs 59 and 60 of the next adjacent strip depending on the direction of twist for the respective strips. The long inner arcuate portion 56b and 57b of the associated side spurs 56 and 57 will engage one of the elongated arcuate portions 58a or 58b of the next adjacent strip. Joinder of the side edges can be by welding or other suitable connecting means depending on the material.

When the vortex generating twisted strips, 55a, 55b, 55c, 55d, 55e and 55f are joined by their side edges in assembled position, as shown in FIGS. 10 to 14 of the drawings, a vortex generating housing, generally designated VGH in assembled position will be connected by the central spurs 58 and held in spaced relation to the inner wall of the housing 51. Vortex generating housing VGH forms a substantially hexagonal inlet opening as at 61, and a hexagonal outlet opening as at 62 at the respective inlet and outlet ends of the housing 52.

The twisted strips 55a, 55b, 55c, 55d, 55e, and 55f which form the vortex generating housing VGH will provide the guide surfaces for forming the vortex generating passages to induce core or central fluid to diverge outwardly and peripheral flow fluid to converge inwardly to provide the desired mixing of the high and low velocity stream filaments, layers or strata of fluid flowing from the upstream approach pipe 1 into the stream filament mixer 50. Opposing inner guide surfaces of adjacent vortex generating strip act to form a plurality of vortex generating passages to induce fluid to flow from the inner or core flow section to the outer or peripheral flow section in the stream filament mixer and the obverse or outer guide surfaces of the vortex generating strips take fluid from the peripheral flow area or space between the vortex generating housing VGH and the inner wall of the housing 52 and form vortex generating passages to pass fluid from the outside or peripheral flow space to the inside or core flow space in the stream filament mixer 50.

Thus, the inner guide flow surfaces 63a and 63b form a first inner to outer vortex generating passage 64a; inner guide surfaces 63c and 63d form a second inner to outer vortex generating passage 64b and inner guide surfaces 63e and 63f form a third inner to outer vortex generating passage 64c.

Similarly, on the obverse or outer side of the vortex generating twisted strips the outer guide surfaces 65a and 65f form an outer to inner vortex generating passage 66a; outer guide surfaces 65b and 65c form a second outer to inner vortex generating 66b and the outer guide surface 65d and 65e form a third outer to inner vortex generating passage 66c.

Thus, in the fluid flowing from the portion of the approach pipe 1 upstream of the stream filament mixer 50 the core flow fluid will enter the housing 1 and pass to the hexagonal inlet opening 61 of the vortex generating housing VGH, while the peripheral flow fluid will pass about the vortex generating housing VGH through the annular space formed between the vortex generating housing and the inner wall of housing 52. The inner to outer vortex generating passages communicate at one end with the hexagonal inlet opening 61 as is shown clearly in FIGS. 9 and 11 of the drawings and open at the ends remote from their inlet end to the annular space about the hexagonal outlet opening 62 formed between the vortex generating housing VGH and the inner wall of housing 52 so that core flow fluid passing into these inner to outer vortex generating passages 64a, 64b and 64c is guided or induced to flow from the inside to the outside or to the peripheral flow area of the housing 50. Simultaneously, the peripheral flow fluid from the upstream approach pipe 1 passing about the vortex generating passages 66a, 66b and 66c which have their inlet end in communication with this space and their outlet end in communication with the hexagonal outlet opening 62 so that peripheral flow fluid will be moved from the outside to the inside core flow area of the stream filament mixer 50.

The effect of this movement of the high and low velocity stream filaments followed by intimate mixing of these diverging and converging streams will act to pass fluid to the downstream approach piping in which the different velocities will be averaged so that a substantially uniform velocity is provided across any given cross-section of the fluid flowing through the downstream approach piping to the flow meter measuring means and the net vortex flow in this fluid will be substantially reduced.

Since the movement of the core fluid and the peripheral flow fluid is accomplished without substantial resistance to the fluid flowing from the upstream piping through the stream filament mixer 50 to the downstream piping there will be a very small differential pressure built up across the stream filament mixer 50 during the mixing operation for achieving the advantageous results of the present invention.

The resultant flow in the downstream approach pipe 1 is adaptable by use in dynamic or head-differential flow meter measuring elements of the nozzle type; the venturi type as is shown herein and the orifice type and therefore will serve to meet and replace the standards required to insure accurate reading of such flow meter measuring elements in piping systems.

Modifications and changes within the various forms of the present invention above described will occur to those skilled in the art and such variations are considered to fall within the scope of the present invention as set forth in the appended claims.

What is claimed is:

1. A stream filament mixer for a fluid flow system comprising:
   a. a housing to be connected in the fluid flow system and including means forming a fluid passage, said fluid flow passage means including an open core section and peripheral sections,
   b. said peripheral sections formed by a plurality of twisted strips circumferentially disposed in the fluid flow passage and attached to said core section and longitudinally of the housing,
   c. each one of said twisted strips connected and twisted in a direction opposite to any adjacent strip,
   d. certain adjacent pairs of twisted strips having opposing faces for defining inner to outer vortex generating passages to induce movement of core fluid from the core section to the peripheral sections of the fluid flow passage,
   e. and certain other adjacent pairs of twisted strips having obverse faces for defining outer to inner vortex generating passages for inducing simultaneous movement of peripheral fluid from the peripheral section to the core sections in the fluid flow passage.

2. In a stream filament mixer as claimed in claim 1 wherein each strip is twisted in general symmetry from end to end 180°.

3. In a stream filament mixer as claimed in claim 1 comprising:
   a. said strips having a width one-third the diameter of the housing,
   b. and said strips spaced at approximately 60° from each other in assembled position.

4. In a stream filament mixer as claimed in claim 1 comprising:
   a. ring means adjacent the inlet end of said housing,
   b. and said elongated strips connected at one edge to said ring means and to an adjacent strip and having at least one other edge connected to the housing,
   c. certain pairs of said strips connected to each other adjacent the inlet end of the housing and certain other adjacent strips connected to each other adjacent the outlet end of said housing.

5. In a stream filament mixer as claimed in claim 4 wherein the strips are connected to each other approximately one-third the distance in from the inlet and outlet end of the housing.

6. In a stream filament mixer as claimed in claim 1 wherein the strips have a plurality of edge projections shaped to mate adjacent strip edges to each other to define the vortex generating passages.

7. In a stream filament mixer as claimed in claim 1 wherein the strips having a width approximately one-half the diameter of the housing.

8. In a stream filament mixer as claimed in claim 1 comprising:
   a. the strips at the inlet end of the housing being attached together to define a hexagonal inlet opening,
   b. the strips at the outlet end of the housing being attached together to define a hexagonal outlet opening,
   c. and said plurality of inner to outer vortex generating passages communicating at their inlet end with said hexagonal inlet opening,
   d. and said outer to inner vortex generating passages communicating at their outlet end with the hexagonal outlet opening.

9. A vortex generating strip for a stream filament mixer for use in a flow passage comprising:
   a. flat strip means,
   b. a plurality of spaced side projections on one edge disposed inwardly of the end of the strip means,
   c. and a central side projection and spaced tip spurs on the other edge of the strip means,
   d. said strip means twisted in general symmetry from end to end 180°, and constructed to be approximately one-half the diameter of said flow passage and of a length substantially equal to the length of the stream filament mixer,
   e. and said construction disposed to permit strips to mate with each other and to facilitate connection of said strips to each other.

* * * * *